United States Patent [19]

Gunnerson et al.

[11] Patent Number: 4,946,694
[45] Date of Patent: Aug. 7, 1990

[54] LIQUID COATING FOR FRUITS

[75] Inventors: Robert E. Gunnerson, Manteca; Richard C. Bruno, Lodi, both of Calif.

[73] Assignee: Sun-Maid Growers of California, Kingsburg, Calif.

[21] Appl. No.: 322,151

[22] Filed: Mar. 10, 1989

[51] Int. Cl.$^5$ .............................................. A23B 9/00
[52] U.S. Cl. ...................................... 426/273; 426/102; 426/310; 426/615
[58] Field of Search ............... 426/102, 333, 252, 273, 426/310, 308, 532, 615

[56] References Cited

U.S. PATENT DOCUMENTS

| | | | |
|---|---|---|---|
| 1,853,151 | 4/1932 | Segur et al. | |
| 2,068,081 | 1/1937 | Sharma | 426/252 |
| 2,084,062 | 6/1937 | Nedirdek | 426/333 |
| 2,133,404 | 6/1938 | Sharma | 426/252 |
| 2,755,189 | 7/1956 | Gericke | 426/252 |
| 2,909,435 | 10/1959 | Watters | 426/102 |
| 2,984,572 | 5/1961 | Barsel et al. | |
| 3,368,909 | 2/1968 | Moore et al. | |
| 3,453,118 | 7/1969 | Joben | 426/102 |
| 3,516,836 | 6/1970 | Shea | |
| 3,726,693 | 4/1973 | Harris | |
| 3,997,674 | 12/1976 | Ukai | 426/310 |
| 4,344,971 | 8/1982 | Garbutt | 426/310 |
| 4,649,057 | 3/1987 | Thomson | 426/532 |
| 4,696,824 | 9/1987 | Meczkowski | 426/102 |

*Primary Examiner*—Carolyn Paden
*Attorney, Agent, or Firm*—Townsend and Townsend

[57] ABSTRACT

An improved coating for sticky fruits and a process for preparing such coated fruits are disclosed.

More particularly, the coating of the invention comprises a vegetable wax, a vegetable oil, a wetting agent and a protein.

The process of the invention comprises the steps of:
(a) coating the fruit with a composition comprising a wetting agent and a suspension of a vegetable wax in a vegetable oil,
(b) adding to the fruit a composition comprising a protein,
(c) removing excess mixture from the fruit, and
(d) drying the fruit.

22 Claims, No Drawings

LIQUID COATING FOR FRUITS

BACKGROUND OF THE INVENTION

This invention relates to protective coatings for fruits.

Fruits which are ordinarily sticky because of the presence of surface deposits of sugar or for other reasons are subject to certain deleterious changes. Such fruits include dates, figs, candied fruits, and dried fruits such as prunes, apricots and raisins. Fruits of this type tend to clump or stick together, creating difficulties in their handling in packaging and in use. Additionally, when they are stored for long periods of time, the fruits may become moldy and inedible. To solve these problems, a presently employed commercial means is to coat the fruit with dustings of sugar, corn syrup solids or dextrose. This detracts from the natural appearance of the fruit and adds undesirable carbohydrates. It has also been previously proposed that the fruits be coated with various coatings such as pectins, waxes and fats. However, these coatings have not been able to prevent the fruits from sticking together when they are applied in the limited amounts necessary to avoid altering the appearance and flavor of the fruit. Coatings such as glycerol or polysaccharides, for use in place of or in addition to the above, have also been suggested and have not solved the problem.

Previous coatings such as waxes, glycerol and the like have been applied to "dry" fruits, that is, fruits which are free of surface moisture. For example when raisins are graded, cleaned and processed commercially, one of the last steps is a wash in clear, warm water. Thus, there is surface moisture on the fruit at the time of packaging, which aids somewhat in helping the fruit to flow into the filling machines. But the previously disclosed fatty-/waxy/polysaccharide and gel materials are not compatible with water. Therefore, in order to obtain a surface coating using such materials, processed raisins must stand for a period of several hours, normally about 24 hours, to allow surface moisture to be absorbed into the raisins before they may be coated, thus adding to the time, labor, expense and equipment required in processing.

There thus remains a need for a coating that gives increased free-flowability to sticky fruits while not detracting from the appearance and taste and while eliminating a time-consuming processing step.

SUMMARY OF THE INVENTION

The present invention provides an improved coating for sticky fruits and a process for preparing such coated fruits.

More particularly, the coating of the invention comprises a vegetable wax, a vegetable oil, a wetting agent and a protein.

The process of the invention comprises the steps of:

(a) coating the fruit with a composition comprising a wetting agent and a suspension of a vegetable wax in a vegetable oil.

(b) adding to the fruit a composition comprising a protein.

(c) removing excess mixture from the fruit and (d) drying the fruit.

DETAILED DESCRIPTION OF THE INVENTION

It has now been found that by first coating naturally sticky fruit pieces with a composition comprising a vegetable wax suspended in vegetable oil in the presence of a wetting agent and then applying a composition comprising a protein, the coated fruits are no longer sticky and the individual pieces of fruit remain separate and non-coherent even after packaging and storage, including storage in humid atmospheres. Additionally, the coatings of the present invention are essentially odorless and thus do not detract from the aroma and taste of the food itself.

Any edible vegetable wax is suitable for use in the present invention. Such waxes include, but are not limited to, carnauba wax, candella wax, sugarcane wax, cocoa wax or cocoa butter, montan wax and the waxes of flax and cottonseed. Non-vegetable waxes such as beeswax and petroleum waxes do not work well in this invention. Carnauba wax is preferred. The vegetable wax is present in the range of from about 5 to about 15 parts by weight.

The vegetable oil in which the vegetable wax is suspended is any vegetable oil which is edible and hydrogenated, with a high titer. Such oils include coconut oil, palm kernel oil, soybean oil, corn oil sesame seed oil, safflower oil, cottonseed oil and combinations thereof. The choice of vegetable oil is not critical in the invention; any vegetable oil having the above characteristics is suitable. One example of a suitable oil is DURKEX ® 500, commercially available from Durkee Products/SMC Corporation, which can be either hydrogenated cottonseed oil or hydrogenated soybean oil. The vegetable oil is present in the range of from about 50 to about 65 parts by weight.

The suspension of a vegetable wax in a vegetable oil may be prepared by blending together finely milled vegetable wax with hydrogenated vegetable oil without the addition of heat. Alternatively, such suspensions may be available commercially and may be used in the invention. Such a commercial suspension is CA-POL ®410 by Kaul GmbH West Germany.

The wetting agents useful in the invention are those which are miscible with an oil phase but completely soluble in water and can form a surface emulsion between a wax/oil phase and water. Wetting agents which may conveniently be used can be chosen from the polyglycerates, ethoxylated mono- and di-glycerides, and the polysorbates such as Polysorbate 60. Polysorbate 65, Polysorbate 80 and Sorbitan monostearate. The polysorbates are preferred. The wetting agent is present in the range of from about 20 to about 40 parts by weight.

The protein may be selected from plant or animal proteins, although plant proteins are preferred since animal proteins are subject to microbial decomposition. An example of animal protein which may be used is gelatin. Examples of plant protein which may be used are oat, wheat, rye and corn proteins. Corn protein (zein) is preferred, as it is more readily available commercially. The protein is present in the range of from about 30 to about 50 parts by weight.

The protein is preferably dissolved in a suitable inert, volatile solvent prior to coating onto the fruit. Such solvents may include, but are not limited to, the following' aliphatic compounds, for example hexane or octane; aromatic compounds, for example benzene, toluene, xylene or mesitylene, chlorinated aliphatic or aromatic compounds, for example methylene chloride, 1,2-dichloroethane or chlorobenzene; ethers, for example 1,2dimethoxyethane, diethyl ether, tetrahydrofuran or 1,4-dioxane; alcohols, for example ethanol or ethylene glycol; carboxylic acids, for example acetic, propionic or butyric acid; amides, for example N,N-dimethylformamide or N-methylpyrrolidinone; and nitriles, for example acetonitrile or butyronitrile.

Various other materials may be included in the coating formulation in minor proportions to give the coating certain characteristics as may be desired. For example, dyes or pigments may be incorporated to form colored coatings. Mould- or bacteria-inhibiting agents may be added to give greater protective value against spoilage organisms. Also, flavoring agents, for example spices condiments and sweetening agents may be added to either fortify, enhance or change the nature of the particular fruit flavor and/or odor involved. For example, it may be desirable to employ a small percentage of a food acid such as citric acid in the coating formulation to provide a somewhat more tart taste to offset the sweetness of the polysorbate or the polyglycerate. Also, concentrated fruit juice can be employed if desired; the fruit flavor will thus be more pronounced. Antioxidants and other preservatives may be incorporated in the compositions to give the coating suitable preservative properties. The coating can also be employed to add vitamins or other nutrients to the fruit being coated. Thus, vitamins, vitamin precursors or nutritionally important mineral salts may be added to the coating composition. It is evident from the above description that one may incorporate in the formulation any type of material to give the coating any desired property from the standpoint of color, preservative action, increasing of flavor or nutritive value and so forth. In addition, one or more carriers may be added, as desired.

In the process of the present invention, the fruit to be coated is placed in contact with a suspension of vegetable wax in vegetable oil in the presence of a wetting agent. The wetting agent may be admixed with the suspension prior to applying to the fruit or it may be added to the fruit separately from the suspension. In a preferred embodiment, the wetting agent is admixed with the suspension prior to application. The suspension may be applied to the fruit by dipping, spraying or any other appropriate manner, with mixing, to completely cover the fruit. After the fruit pieces are well coated, the protein composition is added to the fruit, again preferably with mixing, after which the fruit is dried.

The temperature at which the process is run is not critical. The process is conveniently run at ambient temperature.

The amount of the formulation contacted with the fruit should generally range from about 0.5% to about 2.5% by weight of the fruit. Preferably, it ranges from about 0.75% to 2.0%. This range is dependent to some extent upon the character of the specific ingredients chosen and the amount of each ingredient in the composition.

The method of the invention works best with freshly processed fruit which still retains some surface moisture. The wetting agent is miscible with an oil phase but is soluble in water. Thus, the application of the wax/oil suspension forms a surface emulsion between the wax/oil phase of the coating and the surface water on the fruit due to the emulsifying action of the wetting agent. After the emulsion has totally covered the fruit surface, the protein is added. The wetting agent causes the protein to coagulate intimately with the wax/oil phase, creating a desired durable film coating.

If dry fruit, without surface moisture, is to be treated, the fruit may be moistened by dipping or spraying, for example, with water prior to coating with the suspension.

It is a critical factor in the process of the invention that the wax/oil suspension-wetting agent composition and the protein composition be applied sequentially to the fruit pieces. In this way, the suspension can properly form an emulsion which subsequently interacts with the protein almost instantly. Thus, the raisins do not stick to each other as the varnish-like protein dries. By contrast, when protein alone is used to cover raisins, it actually makes the raisins more sticky, until completely dried at which time any raisins stuck together remain that way. Also, if the compositions are applied together, coagulation results before the fruit can be completely coated, resulting in at least some fruit which will stick together.

The naturally sticky fruit coated in accordance with the present invention possesses improved free-flowability, decreasing or eliminating the sticking together and clumping of the fruits. This free-flowing aspect is useful to both retail consumers and industrial users, allowing ease of handling and mixing with other ingredients. Such free-flowability is also useful to processors, enabling packaging rates to be increased and providing better control of filling weights due to less bridging at the packaging machines. Additionally, the fruits may be compressed into occupying much less cubic space, about 60% or less for the same weight while retaining their free-flowing characteristic at the time of use.

While the treatment of raisins is a preferred embodiment of the invention, any naturally sticky fruit may be used. Such fruits include dates, figs, candied fruits such as candied citron and candied citrus peel, and other dried fruits such as prunes and apricots. The fruits to be coated may be whole fruits or they may be pieces of the fruit, such as slices and dices and those prepared from mashed fruit constituents.

The composition and method of the present invention are further illustrated by the following examples. These examples are offered strictly for purposes of illustration, and are not intended to either limit or to define the invention.

EXAMPLE 1

The following are exemplary formulations. All amounts are in percent by weight.

| Formulation I | |
|---|---|
| Fraction A: | |
| Hydrogenated Vegetable Oil | 80 |
| Carnauba Wax | 19 |
| Citric Acid | 1 |
| Fraction B: | |
| Ethanol | 56 |
| Corn Protein | 40 |
| Glycerin | 3 |
| Citric Acid | 1 |
| BHA-BHT | trace |
| Fraction C: | |
| Polysorbate 60 | 100 |
| Formulation II | |
| Fraction A: | |
| Hydrogenated Vegetable Oil | 57 |
| Carnauba Wax | 10 |
| Polysorbate 60 | 30 |

| -continued | |
|---|---|
| Citric Acid | 1 |
| BHA | 1 |
| Flavoring | 1 |
| Fraction B: | |
| Ethanol | 50 |
| Corn Protein | 40 |
| Hydrogenated Vegetable Oil | 8 |
| Glycerin | 2 |

Corn protein (zein) is available from Zumbro, Inc., Hayfield, Minn. (as the product COZEEN®), from Freeman Industries, Inc., Tuckahoe, N.Y. (as the product Zein G-10 Solution), and from other commercial suppliers.

Polysorbate 60 is available as TWEEN®60 from ICI-United States, as DURKEX® 60 from Durkee Products (SCM Corporation), and from other commercial suppliers.

A suspension of about 10% carnauba wax in hydrogenated vegetable oil is available commercially as CAPOL® 410, produced by Kaul GmbH, West Germany and distributed by Centerchem Inc., Tarrytown, N.Y.

EXAMPLE 2

This is an example of the procedure for coating raisins according to the invention.

To 1000 pounds of raisins in a tumbling agitator mixer, or a ribbon blender, or a finger-auger mixer was added 12 pounds of Fraction A of Formulation II. After the raisins were well coated (approximately 5 to 8 minutes) 8 pounds of Fraction B of Formulation II was added. The mixing was continued for 5 minutes, after which the coated raisins were discharged to a slowly moving drying belt. They were allowed to dry at ambient temperature for 20 minutes.

EXAMPLE 3

Following the procedure of Example 2, 40 parts of Fraction A of Formulation I and 20 parts of Fraction C of Formulation I are added to the raisins, after which 40 parts of Fraction B of Formulation I is added. After coating is complete, the raisins are discharged and dried.

EXAMPLE 4

To determine the free-flowability characteristics of the raisins coated according to the present invention, 454 grams of raisins coated with Formulation II according to Example 2 were packed in a plastic cylinder and subjected to a steady, constant pressure of 0.25 pounds/in$^2$ for one month. The cylinder was then quickly inverted, and the mass of raisins that separated and fell freely and discretely from the cylinder was weighed. All of the coated raisins fell freely from the cylinder giving 100% free-falling raisins (as indicated in Table I, column 2).

The above test was also run using untreated raisins (control), raisins coated with glycerine, and raisins coated with various other combinations of wax, oil, wetting agent and/or protein for comparison purposes. The results, as percent of free-flowing raisins, are given in Table I, column 2.

EXAMPLE 5

The lack of adhesiveness of the surfaces of coated raisins was measured to determine the degree of slickness or lubrication. 500 Grams of raisins coated with Formulation II according to Example 2 were placed in a tall, narrow cylinder (2.5 inches diameter x 10 inches deep) and were subjected to a steady pressure of 87 grams/in$^2$ for one month. The degree of compaction was then measured, and the smaller the compaction as a percent of column height, the greater the lubrication or the lack of adhesiveness of the coated raisins. The coated raisins showed 55.0% compaction, as indicated in Table I, column 3.

The above test was also run using untreated raisins (control), raisins coated with glycerine, and raisins coated with various other combinations of wax, oil, wetting agent and/or protein for comparison purposes. The degree of compaction for each group, as percent of column height, is given in Table I, column 3.

TABLE I

| Test Condition | Free Falling Percent by Weight | Compaction, Percent of Column Height |
|---|---|---|
| Control | 14.19 | 72.5 |
| 15% glycerine | 13.15 | 70.0 |
| Carnauba wax suspension in oil | 83.30 | 65.0 |
| Polysorbate 60 | 1.81 | 95.0 |
| Carnauba wax suspension in oil plus Polysorbate 60 (Fraction A) | 94.49 | 62.5 |
| Corn protein (Fraction B) | 67.33 | 67.5 |
| Carnauba wax suspension in oil plus Corn protein | 87.33 | 65.0 |
| Corn protein plus Polysorbate 60 | 0 | 95.0 |
| Fraction A and Fraction B blended together and applied at once, before coagulation | 80.83 | 92.5 |
| Fraction A followed by Fraction B (process of invention) | 100.0 | 55.0 |

We claim:

1. A system for coating sticky fruit, which system comprises a first composition including a vegetable wax, a vegetable oil and a wetting agent and a second composition including a protein, said first composition being applied to said fruit before said second composition, said first and second compositions being applied in an amount sufficient to give fruit that is no longer sticky.

2. A system according to claim 1 wherein said vegetable oil is hydrogenated.

3. A system according to claim 2 wherein said vegetable oil is selected from coconut oil, palm kernel oil, soybean oil, corn oil, sesame seed oil, safflower oil, cottonseed oil and combinations thereof.

4. A system according to claim 1 wherein said protein is plant protein.

5. A system according to claim 4 wherein said protein is corn protein (zein).

6. A system according to claim 1 wherein said vegetable wax is selected from carnauba wax, candella wax, sugarcane wax, cocoa wax or cocoa butter, montan wax and the waxes of flax and cottonseed.

7. A system according to claim 6 wherein said vegetable wax is carnauba wax.

8. A system according to claim 1 wherein said wetting agent is selected from the polyglycerates and the polysorbates.

9. A system according to claim 8 wherein said wetting agent is selected from the polysorbates.

10. A system according to claim 1 which comprises:
(a) about 5 to about 15 parts of said vegetable wax,
(b) about 50 to about 65 parts of said vegetable oil,
(c) about 20 to about 40 parts of said wetting agent, and
(d) about 30 to about 50 parts of said protein.

11. A system for coating sticky fruit, which system comprises a first composition including carnauba wax, hydrogenated vegetable oil and a polysorbate and a second composition including corn protein, said first composition being applied to said fruit before said second composition, said first and second compositions being applied in an amount sufficient to give fruit that is no longer sticky.

12. A system according to claim 11 which comprises:
(a) about 5 to about 15 parts of carnauba wax;
(b) about 50 to about 65 parts of hydrogenated vegetable oil;
(c) about 20 to about 40 parts of a polysorbate; and
(d) about 30 to about 50 parts of corn protein.

13. A process for coating sticky fruit which comprises the steps, in the following sequential order, of:
(a) coating said fruit with a first composition comprising a wetting agent and a suspension of a vegetable wax in a vegetable oil,
(b) adding to said fruit a second composition comprising a protein,
(c) removing excess mixture from said fruit, and
(d) drying said fruit, to give fruit that is no longer sticky.

14. A process according to claim 13 wherein said vegetable oil is hydrogenated.

15. A process according to claim 14 wherein said vegetable oil is selected from coconut oil, palm kernel oil, soybean oil, corn oil, sesame seed oil, safflower oil, cottonseed oil and combinations thereof.

16. A process according to claim 13 wherein said protein is plant protein.

17. A process according to claim 16 wherein said protein is corn protein (zein).

18. A process according to claim 15 wherein said vegetable wax is selected from carnauba wax, candella wax, sugarcane wax, cocoa wax or cocoa butter, montan wax and the waxes of flax and cottonseed.

19. A process according to claim 18 wherein said vegetable wax is carnauba wax.

20. A process according to claim 13 wherein said vegetable wax is present in about 5 to about 15 parts, said vegetable oil is present in about 50 to about 65 parts, said wetting agent is present in about 20 to about 40 parts, and said protein is present in about 30 to about 50 parts.

21. A process for coating sticky fruit which comprises the steps, in the indicated sequential order, of:
(a) coating said fruit with a first composition comprising a polysorbate and a suspension of carnauba wax in a hydrogenated vegetable oil,
(b) adding to said fruit a second composition comprising corn protein,
(c) removing excess mixture from said fruit, and
(d) drying said fruit, to give fruit that is no longer sticky.

22. A process according to claim 21 wherein said carnauba wax is present in about 5 to about 15 parts, said vegetable oil is present in about 50 to about 56 parts, said polysorbate is present in about 20 to about 40 parts, and said corn protein is present in about 30 to about 50 parts.

* * * * *